United States Patent

Irwin

[11] 3,886,735
[45] June 3, 1975

[54] CERAMIC COMBUSTION LINER
[75] Inventor: John A. Irwin, Indianapolis, Ind.
[73] Assignee: General Motors Corporation, Detroit, Mich.
[22] Filed: Apr. 1, 1974
[21] Appl. No.: 456,602

[52] U.S. Cl. .............. 60/39.65; 60/200 A; 431/352
[51] Int. Cl. ......................... F02c 1/00; F23d 15/00
[58] Field of Search............ 60/39.65, 39.66, 200 A; 431/352, 116

[56] References Cited
UNITED STATES PATENTS 3,407,596   10/1968   Dasbach et al. ................ 60/39.66 X
3,594,109   7/1971    Penny ............................. 60/39.65 X
3,754,393   8/1973    Handa ............................ 60/39.65 X Primary Examiner—C. J. Husar
Assistant Examiner—Thomas I. Ross
Attorney, Agent, or Firm—Paul Fitzpatrick

[57] ABSTRACT

A combustion liner for a gas turbine combustion apparatus has a wall of ceramic material. To minimize destructive thermal gradients in the ceramic material due to local cooling by air entering the liner through ports for combustion or dilution air, the walls of these ports are shielded from the entering air jets by means contracting the entrance to each port so that the vena contracta effect keeps the jet away from the wall.

11 Claims, 10 Drawing Figures

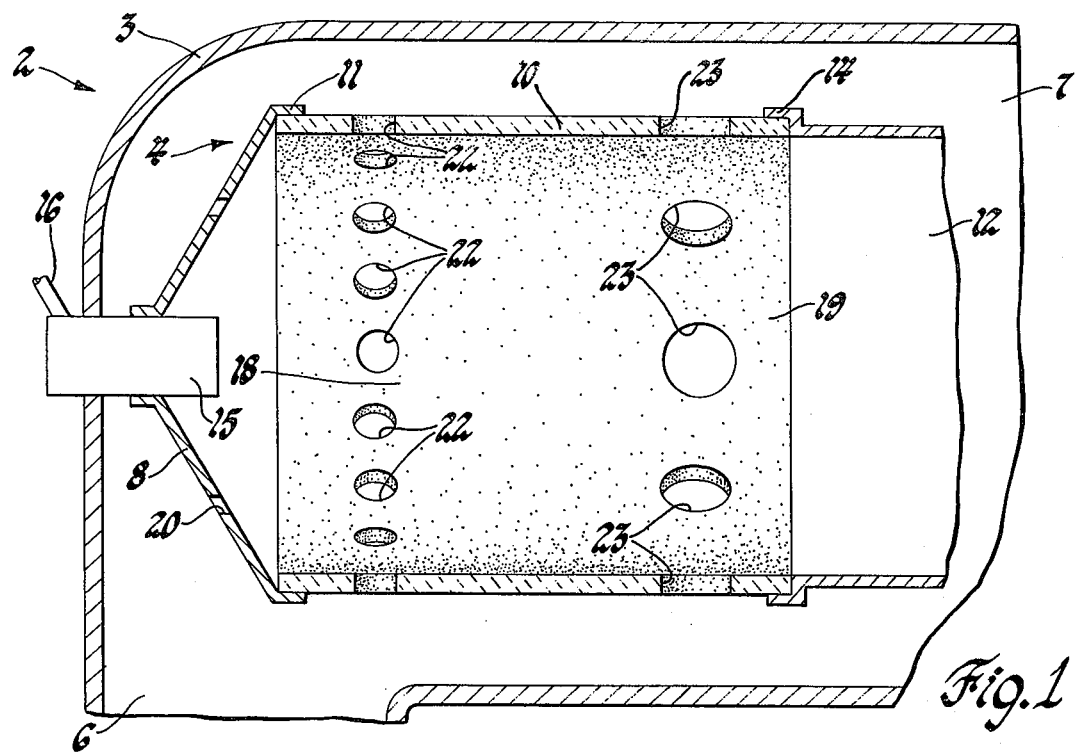
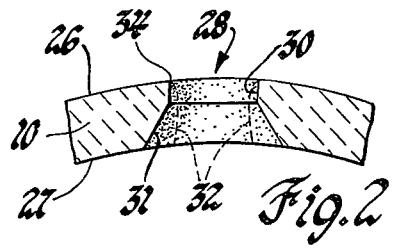
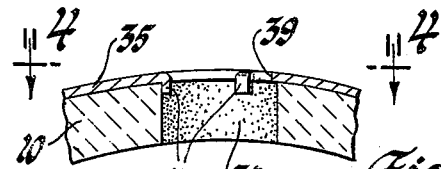
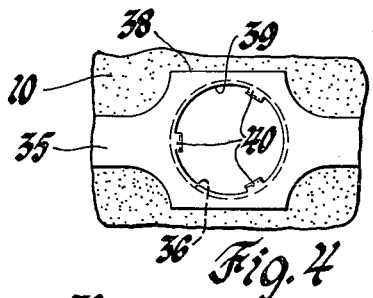
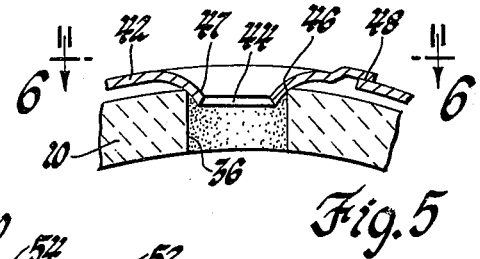
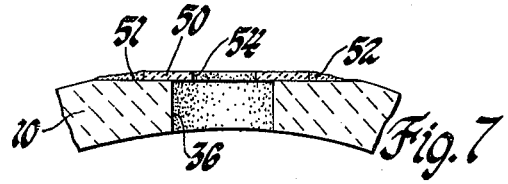
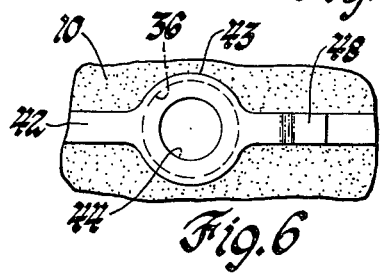
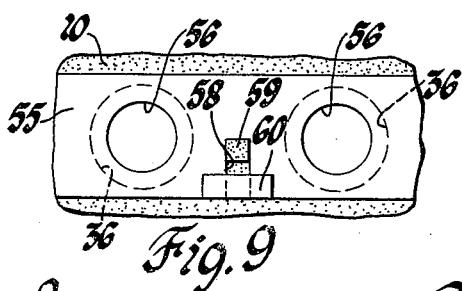
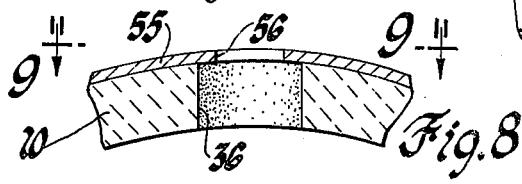
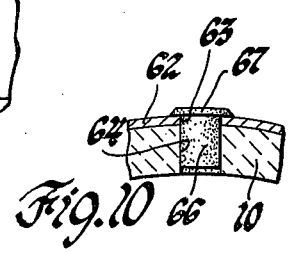

CERAMIC COMBUSTION LINER

My invention is directed to combustion apparatus such as is employed in gas turbine engines. Particularly, it is directed to improvements in ceramic combustion liners operative to reduce thermal gradients attendant upon the entrance of air into the liner through the usual ports.

It is well know that combustion apparatus of the sort employed in gas turbine engines ordinarily includes an outer housing or casing to which compressed air is introduced and a combustion liner into which the air flows from the housing and within which combustion takes place between the air so entering and fuel which is sprayed or otherwise diffused within the liner. In such devices, the combustion is quite intense and the heat is high; in fact, in many cases the air entering the combustion apparatus is at about 1000°F. and often it is at 2000°F. or higher at discharge from the combustion apparatus. The maximum temperature in the flame zone may be 3000°F. or higher.

Typical prior art combustion apparatuses have employed combustion liners of high temperature resistant metal alloys. These have been quite successful, but are also quite expensive.

It appears highly desirable to find a satisfactory way to substitute molded ceramic liners or portions of liners for the metal liners previously employed. High temperature resisting ceramic compositions may be formed or molded and fired to provide accurately dimensioned parts of very high temperature resisting capabilities which have some advantages other than cost over the metal structures referred to above. However, there are difficulties attendant upon the use of such ceramics, among them being the likelihood of cracking or breakage of the ceramic material due to stresses resulting from thermal gradients. Such gradients cause high stresses in the ceramic material, which is brittle rather than ductile as in the case of the metal liner.

In the usual combustion liner the air for combustion is introduced through ports in the wall of the liner and dilution air is introduced through ports at the downstream end of the combustion zone of the liner to reduce the temperature of the combustion products. Obviously, with a liner in which intense combustion is taking place, the ceramic wall will be very hot. On the other hand, the combustion air entering through the ports is ordinarily at least 1000° cooler than the flame temperature. It is inconsistent with satisfactory service life ceramic to have the margins of the air ports cooled by the entering air to a temperature much lower than the immediately surrounding parts of the liner wall.

My present invention is based upon the concept of providing restrictions or orifices contracting the entrances of these ports in the liner so as largely to isolate the ceramic material from scouring by the entering air, because of the vena contracta effect. It also involves structures of the restrictions and of arrangements for retaining them in place.

The principal objects of my invention are to provide an improved gas turbine combustion apparatus of lower cost, to provide a ceramic combustion liner wall structure best adapted to meet the requirements of practice, to provide simple, reliable, and inexpensive means for protecting ceramic liner walls from combustion or dilution air entering through ports in the wall, and to provide improved and highly suitable structures of restricting arrangements for so isolating the liner wall from the entering air.

The nature of my invention and its advantages will be apparent to those skilled in the art from the succeeding detailed description of preferred embodiments of the invention and the accompanying drawings of them.

FIG. 1 is a schematic illustration of a gas turbine combustion apparatus incorporating a ceramic liner wall, taken in a plane containing the axis of the liner.

FIG. 2 is a fragmentary transverse sectional view of a liner as in FIG. 1 including a first form of means for protecting the liner from entering air.

FIG. 3 is a view similar to FIG. 2 of a second form of the invention.

FIG. 4 is a plan view of the same, taken on the plane indicated by the line 4—4 in FIG. 3.

FIG. 5 is a view similar to FIG. 2 of a third form of the invention.

FIG. 6 is a plan view of the same, taken on the plane indicated by the line 6—6 in FIG. 5.

FIG. 7 is a view similar to FIG. 2 of a fourth form of the invention.

FIG. 8 is a view similar to FIG. 2 of a fifth form of the invention.

FIG. 9 is a plan view of the same, taken on the plane indicated by the line 9—9 in FIG. 8.

FIG. 10 is a fragmentary cross-sectional view illustrating a further mode of locating a ring on the liner.

FIG. 1 shows somewhat schematically one form of general arrangement of a gas turbine combustor incorporating a ceramic liner wall. The combustion apparatus 2 includes a housing 3 enclosing a generally cylindrical space within which a combustion liner 4 is mounted. Compressed air for combustion may enter the housing through an air entrance 6. The other end of the housing may be closed by means not illustrated. Alternatively, the compressed air might enter through the downstream end 7 of the housing, and the air entrance 6 could be closed. The combustion liner 4 includes a dome or upstream end closure 8 and a side wall 10 preferably of circular cross section. The side wall is made of a suitable ceramic material; for example, silicon carbide. The side wall is inserted within a peripheral flange 11 of the dome at its upstream end and its downstream end is coupled to a duct 12 which conducts the combustion products to a turbine or other user (not illustrated). As shown, the downstream end of the liner is seated in an enlarged seat 14 at the upstream end of duct 12. The wall 10 is thus supported by dome 8 and duct 12. As illustrated, the upstream end of the liner is supported by a fuel nozzle 15 mounted in the wall of housing 3, to which fuel is supplied by a fuel line 16.

The liner defines a combustion zone indicated generally at 18 toward the upstream end of the liner 10 and a dilution zone indicated at 19 towards the downstream end of the liner. Some air for combustion may enter through the fuel nozzle. More air ordinarily enters through ports such as those indicated as 20 in the dome and, generally, the greater part of the combustion air enters through one or more rows of ports 22 distributed circumferentially around the liner. The structure of dome 8 may be similar to that illustrated in U.S. Pat. No. 3,656,298 of Wade issued Apr. 18, 1972, except that there is no air admission at the outer edge of the dome.

Dilution air, which ordinarily is of greater quantity than combustion air, may enter the liner through a circumferential row of larger ports 23 toward the downstream end of the liner. Except for the ceramic liner wall, the structure of the engine and of the combustion apparatus may be similar to those described in United States patents as follows: Collman et al. U.S. Pat. Nos. 3,077,074, Feb. 12, 1963; Collman et al. 3,267,674, Aug. 23, 1966; and Bell 3,490,746, Jan. 20, 1970.

As to all the air ports 22 and 23, it will be apparent that relatively cool air flowing through the ports at fairly high velocity will tend to cool the liner wall 10 immediately in the vicinity of the ports to a temperature substantially below that of the adjoining portions of the wall. Such thermal gradients set up mechanical stresses in the material which have been found in practice to result in spalling or cracking of the liner wall which may render it unfit for service in an undesirably short time.

My invention is directed to providing simple, reliable, and inexpensive means to overcome this problem by channeling the flow into the liner ports through restrictions, orifices, or the like which isolate the ceramic material from direct contact with the inflowing compressed air jets. Various physical forms or embodiments of the invention are illustrated in FIGS. 2 through 10 of the drawings. It will be understood that any of these forms could be employed with the liner structure illustrated in FIG. 1. In these figures, the liner wall 10 of FIG. 1 is illustrated fragmentarily, but sufficiently to illustrate the particular embodiment. In all of FIGS. 2 through 10 the air hole indicated is intended to include a primary air port 22 or a dilution air port 23.

FIG. 2 illustrates the simplest embodiment of the invention. FIG. 2 illustrates a portion of the liner wall 10 in cross section, the outer surface being indicated as 26 and the inner surface as 27. The air port 28 has a short cylindrical outer or entrance portion 30 and a diverging inner or discharge portion 31. The portion 30 defines an orifice. The length of the portion 30 may be increased, or decreased to near zero if desired. If it is too short, the structure is less rugged; and if it is too long, the desired divergence of the ports may not be accomplished.

The rationale of the structure illustrated in FIG. 2 is pointed out by the broken lines 32 which indicate in a general way the flow of a fluid such as air under pressure through an orifice in an otherwise generally flat surface such as the outer surface 26 of the liner. The jet contracts, as it leaves the lip 34 where the port 28 intersects the outer surface 26, to a minimum dimension known as the vena contracta and then diverges, generally as indicated by the lines 32. The diverging portion 31 of the port is intended to keep clear of the rapidly moving air jet and leave the wall bounding the hole exposed only to relatively stagnant air. As heat transfer from the wall to the flowing air is largely a function of the velocity of the air at the wall surface, this isolation of the ceramic wall from direct contact with the air jets very substantially reduces cooling of the liner around the port 28.

Other forms of the invention illustrated in the remaining figures involve the application of structure defining an orifice somewhat smaller than the port in the ceramic wall to the outer surface of the liner. These also depend upon spacing of the stream from the wall by the smaller inlet and by the natural contraction of the stream as it enters as in FIG. 2.

In the form of FIGS. 3 and 4, a metal band or strip 35 encircles the liner over a ring of ports 36 to define a flow controlling ring circling the liner. The band 35 is preferably narrower than the diameter of the ports and, in this case, has wider sections or barrier plates 38 overlying the location of the ports 36. The band 35 is formed with apertures or orifices 39 of slightly smaller diameter than the port 36, which in this case may preferably be cylindrical. To assure proper alignment of the orifice 39 with the port 36, centering means is provided comprising three tabs 40 disposed approximately 120° apart around the axis of the port. These tabs, which initially extend inwardly toward the center of the orifice 39 are deformed downwardly; that is, radially inwardly toward the center of the liner, so as to provide tabs or fingers engaging the wall of the ports at three circumferentially spaced points to align the orifice with the ports. The ring 35 defining the barriers to flow may be installed by wrapping a strip around the liner, bringing the ends of the strip 35 together, and welding or otherwise securing them. Such welding or securement is illustrated, for example, in FIG. 5.

In the form illustrated in FIGS. 5 and 6, a ring 42 encircles the liner over a row of ports 36. The ring 42 comprises a band having enlarged portions or barriers 43 of generally circular outline at the location of each port 36. The portions 43 are punched to define orifices 44 smaller than the diameter of the hole 36 with the portion of the strip around the orifice 44 defining a barrier extending over the lip 46 of the port. The portions 43 are deformed inwardly around the orifice 44 to provide an inwardly extending projection 47 which fits within the lip 46 of the port. These projections 47 enter into the ports to positively locate the ring with the orifices centered over the ports. When the strip 42 is wrapped around the liner, the ends may be brought together, overlapped, and spot-welded at 48.

In FIG. 7, the barrier to flow along the wall of port 36 is provided by a washer 50 laid over each port and cemented in place. The washer may be of the same material as the wall 10 or at least of a material having the same coefficient of thermal expansion. Washer 50 is laid in a flat area 51 machined in the outer surface of the liner and is fixed to the liner by a ring of suitable cement 52 around the perimeter of the washer. As previously, the washer defines an orifice 54 of smaller diameter than port 36.

FIGS. 8, 9, and 10 show structures in which a band encircling the liner is retained in other ways. In these forms, a band or strip encircling the liner 10 defines an orifice 56 centered over each port 36. The band may be continuous or may be joined after application. By virtue of its means of retention, a continuous band can be slipped over the liner.

As illustrated in FIG. 9, the band 55 is provided with notches 58 in one edge which embrace small bosses 59 which are integral with and extend from the liner. After the band has been slipped into place with the bosses 59 in the notches, a small strip 60 of metal is spot-welded across the notch 58 to hold the band in place. Two or three such locating means may be provided around the circumference of the liner.

In FIG. 10 the band 62, which may be otherwise similar to that of FIGS. 8 and 9, is provided with holes 63 which overlie holes 64 in the liner. To retain the liner in place, a plug 66 of suitable material such as a glassy ceramic, for example, is bonded to the wall within holes 64. The head of the plug may be softened and expanded to form a rivet-like head 67 extending over the band 62. In this case also the band may be slid over the liner and then located by one or more such plugs or rivets 66.

It will be clear from the foregoing that I have disclosed various arrangements for constricting the entrance to the ports in the liner by means providing a barrier such that the fast-flowing air jet does not scour the wall bounding the hole in the ceramic. The resulting decrease in heat transfer to the air leads to diminution of thermal gradients in the liner and contributes to greater life.

The detailed description of the preferred embodiments of the invention for the purpose of explaining the principles thereof is not to be considered as limiting or restricting the invention, since many modifications may be made by the exercise of skill in the art.

I claim:

1. A combustion apparatus comprising a combustion liner defining a space for combustion of fuel, the liner having a wall of ceramic material defining the exterior of the liner and defining ports for admission of air into the liner, the air being significantly cooler than the liner in normal operation of the combustion apparatus, and means for reducing thermal stresses in the wall due to local cooling of the wall by air streams entering through the ports providing a barrier contracting the entrance to the ports so that the air streams remain substantially clear of the wall, thus minimizing transfer of heat from the wall to the streams.

2. A combustion apparatus comprising a combustion liner defining a space for combustion of fuel, the liner having a wall of ceramic material defining the exterior of the liner and defining ports for admission of air into the liner, the air being significantly cooler than the liner in normal operation of the combustion apparatus, and means for reducing thermal stresses in the wall due to local cooling of the wall by air streams entering through the ports by contracting the entrance to the ports so that the air streams remain substantially clear of the wall, thus minimizing transfer of heat from the wall to the streams, the said means comprising ports diverging in the direction of air flow.

3. An apparatus as defined in claim 2 in which the wall of the liner defining the port diverges in the direction of air flow.

4. An apparatus as defined in claim 2 in which an annular barrier overlying the port defines an air admission orifice smaller than the port.

5. A combustion apparatus comprising a combustion liner defining a space for combustion of fuel, the liner having a wall of ceramic material of approximately circular cross section defining the exterior of the liner and defining a circumferential row of ports for admission of air into the liner, the air being significantly cooler than the liner in normal operation of the combustion apparatus, and means for reducing thermal stresses in the wall due to local cooling of the wall by air streams entering through the ports providing a barrier contracting the entrance to the ports so that the air streams remain substantially clear of the wall, thus minimizing transfer of heat from the wall to the streams.

6. A combustion apparatus comprising, in combination, a combustion liner defining a space for combustion of fuel, the liner having a wall of ceramic material of approximately circular cross section defining the exterior of the liner and defining a circumferential row of ports for admission of air into the liner, the air being significantly cooler than the liner in normal operation of the combustion apparatus, and means for reducing thermal stresses in the wall due to local cooling of the wall by air streams entering through the ports by contracting the entrance to the ports so that the air streams remain substantially clear of the wall, thus minimizing transfer of heat from the wall to the streams, the said means comprising a barrier having an opening of smaller size than the entrance to the port disposed over each entrance and ring means encircling the liner interconnecting the barriers for a row of said ports.

7. An apparatus as defined in claim 6 including also means spaced from the ports connecting the ring means and wall to align the barriers with the ports.

8. A combustion apparatus comprising, in combination, a combustion liner defining a space for combustion of fuel, the liner having a wall of ceramic material of approximately circular cross section defining the exterior of the liner and defining a circumferential row of ports for admission of air into the liner, the air being significantly cooler than the liner in normal operation of the combustion apparatus, and means for reducing thermal stresses in the wall due to local cooling of the wall by air streams entering through the ports by contracting the entrance to the ports so that the air streams remain substantially clear of the wall, thus minimizing transfer of heat from the wall to the streams, the said means comprising a barrier having an opening of smaller size than the entrance to the port disposed over each entrance and ring means encircling the liner interconnecting the barriers for a row of said ports, each barrier including a portion projecting into the port to center the barrier over the port.

9. An apparatus as defined in claim 8 in which the said portion of the barrier is provided by tabs extending into the port.

10. An apparatus as defined in claim 8 in which the said portion of the barrier is provided by a conical surface of the barrier.

11. A combustion apparatus comprising, in combination, a combustion liner defining a space for combustion of fuel, the liner having a wall of ceramic material of approximately circular cross section defining the exterior of the liner and defining a circumferential row of ports for admission of air into the liner, the air being significantly cooler than the liner in normal operation of the combustion apparatus, and means for reducing thermal stresses in the wall due to local cooling of the wall by air streams entering through the ports by contracting the entrance to the ports so that the air streams remain substantially clear of the wall, thus minimizing transfer of heat from the wall to the air streams, the said means comprising a ring encircling the liner at the location axially of the liner of a row of said ports, the ring overlying the ports to provide an orifice centered with each port of smaller size than the entrance to the port and an annular barrier projecting past the lip of the port, and means connecting the liner and ring maintaining alignment of the orifices with the ports.

* * * * *